United States Patent [19]

Thompson

[11] B 3,997,919

[45] Dec. 14, 1976

[54] CARTRIDGE TAPE MACHINE CLEANER APPARATUS

[76] Inventor: Larry L. Thompson, 2012 N. Bell St., Kokomo, Ind. 46901

[22] Filed: Mar. 11, 1974

[21] Appl. No.: 449,892

[44] Published under the second Trial Voluntary Protest Program on March 23, 1976 as document No. B 449,892.

[52] U.S. Cl. .............................. 360/137; 360/128; 360/132; 240/10.65

[51] Int. Cl.² .......................................... G11B 5/41

[58] Field of Search ................... 360/128, 132, 137; 240/2.18, 10.65; 15/210 R, 257 R; 352/78 R

[56] References Cited

UNITED STATES PATENTS

| | | | |
|---|---|---|---|
| 3,439,922 | 4/1969 | Howard | 360/132 |
| 3,596,653 | 8/1968 | Hotchkiss | 240/2.18 |
| 3,647,990 | 3/1972 | Eul, Jr. et al. | 360/128 |

*Primary Examiner*—James W. Moffitt
*Attorney, Agent, or Firm*—Woodard, Weikart, Emhardt & Naughton

[57] ABSTRACT

Apparatus to enable efficient cleaning of the tape-contacting and associated elements of a cartridge tape machine. An open-backed tape cartridge shell is inserted in conventional fashion into a cartridge tape machine to provide access through the tape cartridge shell to the tape-contacting elements of the cartridge tape machine. Included within the tape cartridge shell are batteries and a light bulb aimed toward the tape-contacting elements of the tape machine as well as a switch for energizing the light bulb.

8 Claims, 3 Drawing Figures

CARTRIDGE TAPE MACHINE CLEANER APPARATUS

BACKGROUND OF THE INVENTION

1. Field of the Invention

The invention is in the field of sound recording and reproducing cleaning devices.

2. Description of the Prior Art

A variety of tape machines, both players and recorders and combinations of the two, are available which utilize tape cartridges. Typically, these cartridges contain a continuous loop of magnetic sound-recording tape and are inserted into the cartridge tape machine by forcing open a flap door with the cartridge and pushing the cartridge forward into the machine to a detented position in which the front end of the cartridge is maintained adjacent the capstan and tape head (or heads) of the machine.

In operation, these cartridge tape players and recorders accumulate dust, dirt and oxides, from the cartridge tape, on the head, capstan and sensing fingers. In cleaning these parts, it is very difficult to hold the flapper door of the cartridge tape machine open, depress the sensing switch within the tape machine in order to activate the capstan, and at the same time have a hand free to clean the various parts with a long-handled alcohol soaked swab. A further problem is that the visibility of the parts to be cleaned within the machine is very poor.

There are prior art devices for effecting some measure of cleaning of the playback head and capstan of a cartridge-type magnetic tape player. In such devices, a continuous loop of abrasive tape in an essentially standard cartridge housing is used to clean the playback head of the tape player by inserting the cartridge in the playback machine. The abrasive tape is then run past the playback head. One such device is disclosed in U.S. Pat. No. 3,439,922 to Howard. The Howard device also includes means for stopping the movement of the abrasive tape so that the rotating capstan will be cleaned by the abrasive tape when the tape is stationary.

A wider-ranging and thorough cleaning operation for the tape-contacting and related components of the cartridge tape machine would be possible if convenient direct access could be provided to the components to be cleaned. Direct cleaning, such as with an alcohol-soaked swab, if made possible by providing the necessary access and illumination within the cartridge tape machine, would allow a person doing the cleaning to have the freedom to clean parts not contacted by the cartridge tape as well as permitting thorough cleaning of the tape-contacting parts within the tape machine.

SUMMARY OF THE INVENTION

One embodiment of the present invention is an apparatus for facilitating cleaning of the tape-contacting and associated elements in a cartridge tape machine comprising a tape cartridge shell defining an open area in its rear portion and a first open area in its front portion and operable to be inserted in a cartridge tape machine, and illumination means attached to the shell for lighting the interior of the cartridge tape machine when the shell is inserted in the cartridge tape machine.

It is an object of the present invention to provide convenient access within a cartridge tape machine for cleaning of the tape-contacting and associated elements of the machine.

It is a further object of the present invention to provide illumination and access within a cartridge tape machine to facilitate cleaning of the tape-contacting and associated elements of the machine.

Further objects and advantages of the present invention shall be apparent from the following detailed description and accompanying figures.

DESCRIPTION OF THE PREFERRED EMBODIMENT

Figure 3:
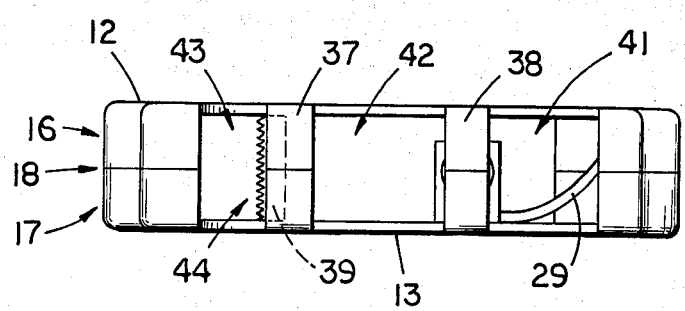
FIG. 3 is a front end view of the apparatus of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
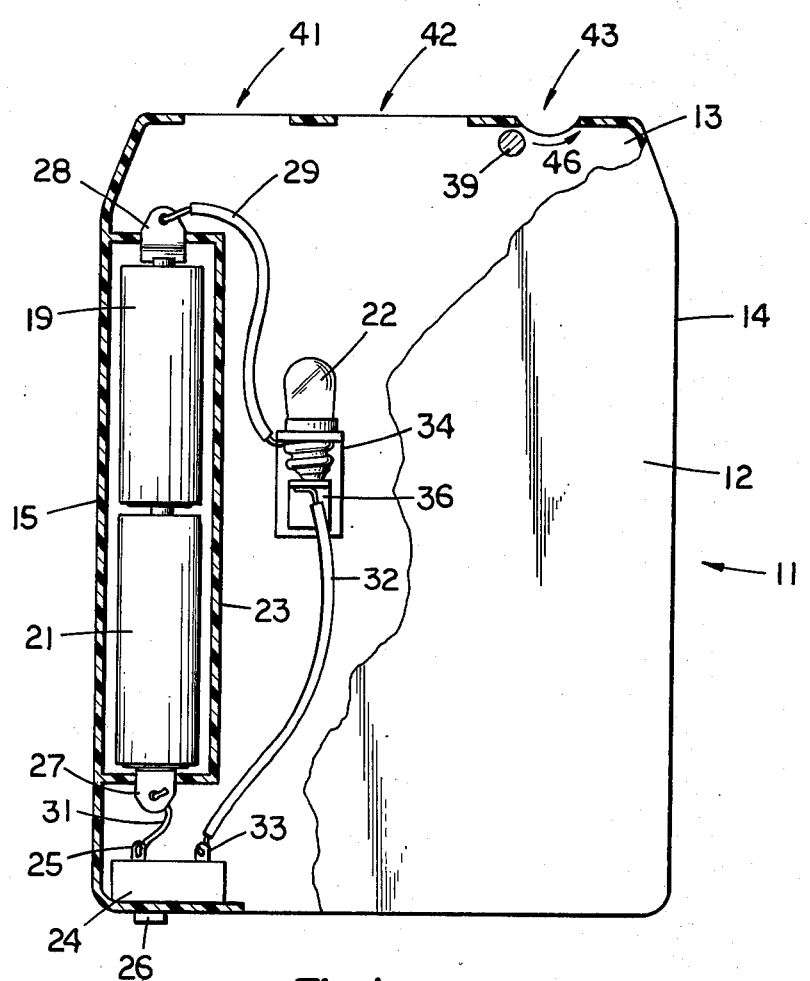
FIG. 1 is a top view of a tape cartridge apparatus according to the present invention with a portion of the top wall removed.

Referring in particular to FIG. 1, there is shown a tape cartridge shell 11 having a top wall 12, bottom wall 13, and side walls 14 and 15. Shell 11 is a plastic material and comprises a top half 16 and lower half 17 releasably attached along seam 18 (FIG. 3) in a conventional manner.

Mounted within tape cartridge shell 11 are batteries 19 and 21 and light bulb 22. Batteries 19 and 21 are retained within partition 23 on the inside of bottom wall 13. Mounted at either end of partition 23 are battery clips 27 and 28, and partition 23 is sized so that when batteries 19 and 21 are inserted within partition 23, they are forced into electrical contact with battery clips 27 and 28. Wire 29 couples the potential at battery clip 28 to bracket 34 and hence light bulb 22, and wire 31 couples battery clip 27 to terminal 25 of slide switch 24. Wire 32 couples terminal 33 of slide switch 24 to contact 36 and hence light bulb 22. One contact of bulb 22 is mounted in electrical contact within bracket 34; and, when thus mounted in the bracket, bulb 22 has a second terminal touching spring contact 36. Conventional slide switch 24 is therefore operable to couple electrical current through bulb 22, illuminating the bulb, by connecting terminals 25 and 33 through the operation of slide member 26 on slide switch 24.

Figure 2:
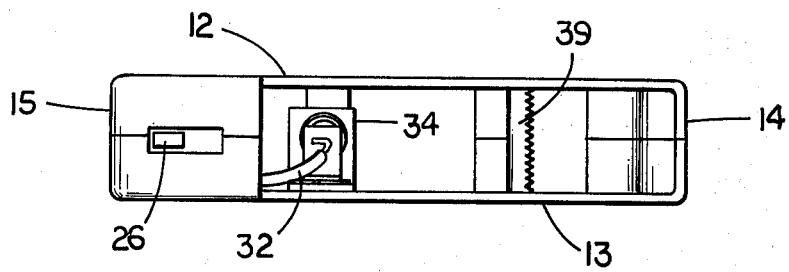
FIG. 2 is a rear end view of the apparatus of FIG. 1.

As shown in FIG. 2, the rear wall of cartridge shell 11 is confined to the vicinity of switch 24, leaving a large opening in the rear of the tape cartridge shell. As shown in FIG. 3, the front portion of cartridge shell 11 is essentially open but includes reinforcing portions 37 and 38 extending from top wall 12 to bottom wall 13. Access is provided at the front end of cartridge shell 11 through openings 41, 42 and 43.

To perform a cleaning procedure using the apparatus, tape cartridge shell 11 is inserted in a tape cartridge machine in the same manner and position as a standard tape cartridge. In this position, the front end of cartridge shell 11 is adjacent the capstan and head (or heads) of the tape machine, and the top wall 12 of shell 11 operates to hold the flapper door of the tape machine open. The front end portion of cartridge shell 11 activates the sensing switch of the tape player, providing rotation of the capstan. Access is provided through the open area at the rear portion of tape cartridge shell 11, through shell 11, and through openings 41, 42 and 43, to permit cleaning the tape head (or heads), capstan and sensing fingers of the tape machine, and any other interior parts to be cleaned. Illumination is provided by light bulb 22 powered by batteries 19 and 21, to assist in performing the cleaning operation. Bulb 22 is turned on by operating slide member 26 of slide switch 24 to couple power from the batteries 19 and 21 to bulb 22.

The cleaning operation is performed with a long stick or handle having an alcohol-soaked cotton swab attached to its distal end. The tape machine head (or heads) and sensing fingers may be cleaned by direct swabbing. For cleaning the capstan of the tape machine, post 39 is provided slightly removed from opening 43 and extending essentially from top wall 12 to bottom wall 13 of tape cartridge shell 11. As shown in FIG. 3, post 39 includes serrated edge 44, which extends along the portion of post 39 facing opening 43. During the cleaning operation, the capstan is rotating in the direction of arrow 46 (FIG. 1), and the alcohol-soaked swab is moved up and down post 39 along serrated edge 44 while being pushed between serrated edge 44 and the rotating capstan, thereby providing rapid and effective cleaning of the entire capstan surface. The movement of the swab along serrated edge 44 is easily accomplished by rotating the stick or rod to which the alcohol-soaked swab is attached.

After the cleaning procedure has been effected, bulb 22 is switched off by means of slide switch 24, and tape cartridge shell 11 is removed from the tape machine. Tape cartridge shell 11 is illustrated as a two-piece construction, having a top half 16 and a bottom half 17, but it is contemplated that shell 11 may conveniently be made of a one piece construction of a molded plastic. It is further contemplated that there may be an opening in side wall 15 of shell 11, or a removable portion, in order to provide for convenient replacement of batteries 19 and 21. Additionally, the present apparatus might be used to provide access and illumination to interior components of a cartridge tape machine for repair or other purposes as well as cleaning.

While there have been described above the principles of this invention in connection with specific apparatus, it is to be clearly understood that this description is made only by way of example and not as a limitation in the scope of the invention.

What is claimed is:

1. Apparatus for facilitating access to the tape-contacting and associated elements in a cartridge tape machine comprising a tape cartridge shell defining an open area in its rear portion and a first open area in its front portion and operable to be inserted in a cartridge tape machine, and illumination means attached to the shell for lighting the interior of the cartridge tape machine when the shell is inserted in the cartridge tape machine.

2. The apparatus of claim 1 in which the illumination means includes a light bulb mounted within the shell.

3. The apparatus of claim 2 in which the illumination means further includes a battery mounted within the shell and coupled to the light bulb.

4. The apparatus of claim 3 in which the illumination means further includes a switch attached to the shell and electrically connected between the battery and the light bulb, the switch being operable to couple electrical power from the battery to the light bulb.

5. The apparatus of claim 1 in which the tape cartridge shell includes a projecting portion between the top and bottom of the shell, the projecting portion having a serrated edge adjacent the first open area of the front portion of the shell.

6. The apparatus of claim 5 in which the front portion of the tape cartridge shell includes second and third open areas, and in which the projecting portion is positioned so that its serrated edge is presented at one side of the first open area of the front portion of the tape cartridge shell.

7. The apparatus of claim 6 which further comprises illumination means including a light bulb mounted within the shell, a battery mounted within the shell and coupled to the light bulb, and a switch attached to the shell and electrically connected between the battery and the light bulb, the switch being operable to couple electrical power from the battery to the light bulb.

8. A method for cleaning a capstan in a cartridge tape machine comprising the steps of:
inserting a tape cartridge shell, having open areas in its front and rear portions and including a projecting portion with a serrated edge adjacent an open area in the front portion, into the cartridge tape machine and effecting the rotation of the capstan of the cartridge tape machine;
inserting a swab on the distal end of a rod into the tape cartridge shell;
engaging the swab in contact with both the rotating capstan and the serrated edge; and
moving the swab along the serrated edge by rotating the rod.

* * * * *